(12) United States Patent
Jaiswal et al.

(10) Patent No.: US 8,902,852 B2
(45) Date of Patent: *Dec. 2, 2014

(54) INTER-RAT HANDOVER CONTROL USING EMPTY GRE PACKETS

(75) Inventors: Suraj Jaiswal, Milpitas, CA (US); Renhua Wen, San Ramon, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 606 days.

This patent is subject to a terminal disclaimer.

(21) Appl. No.: 13/111,141

(22) Filed: May 19, 2011

(65) Prior Publication Data

US 2012/0294277 A1    Nov. 22, 2012

(51) Int. Cl.
*H04W 4/00*     (2009.01)
*H04W 36/00*    (2009.01)
*H04W 36/02*    (2009.01)
*H04W 88/16*    (2009.01)
*H04W 36/14*    (2009.01)

(52) U.S. Cl.
CPC ............ *H04W 36/023* (2013.01); *H04W 88/16* (2013.01); *H04W 36/14* (2013.01)
USPC .......................................... 370/331; 455/436

(58) Field of Classification Search
CPC .................................................... H04W 36/00
USPC ........................................................ 370/331
See application file for complete search history.

(56) References Cited

U.S. PATENT DOCUMENTS

| | | | |
|---|---|---|---|
| 2002/0145991 A1* | 10/2002 | Miya et al. | 370/337 |
| 2002/0154653 A1 | 10/2002 | Benveniste | |
| 2004/0013118 A1* | 1/2004 | Borella | 370/395.2 |
| 2005/0058149 A1* | 3/2005 | Howe | 370/428 |
| 2005/0213540 A1* | 9/2005 | Matsumoto | 370/331 |
| 2006/0034313 A1 | 2/2006 | Aaltonen | |
| 2007/0110034 A1* | 5/2007 | Bennett | 370/352 |
| 2008/0281978 A1 | 11/2008 | Tang et al. | |
| 2009/0316656 A1* | 12/2009 | Zhao et al. | 370/331 |
| 2010/0111041 A1 | 5/2010 | Lim et al. | |

(Continued)

FOREIGN PATENT DOCUMENTS

| | | | |
|---|---|---|---|
| WO | WO 2010/069402 A1 | 6/2010 | |
| WO | WO2010/069985 A1 | 6/2010 | |
| WO | WO 2010/074143 A1 | 7/2010 | |

OTHER PUBLICATIONS

3GPP Specification TS 36.300 V10.2.0 "Technical Specification Group Radio Access Network; Evolved Universal Terrestrial Radio Access (E-UTRA) and Evolved Universal Terrestrial Radio Access Network (E-UTRAN); Overall description; Stage 2" Release 10, Dec. 21, 2010, the whole document.

(Continued)

*Primary Examiner* — Gerald Smarth

(57) ABSTRACT

Empty GRE packets are used to provide in-order delivery of data packets for a session to a UE during inter-RAT handover. In particular, an empty GRE packet sent from a source gateway in a source RAN to a target gateway in a target RAN indicates to the target gateway the end of forwarded data packets from the source gateway. The target gateway sends data packets received from the source gateway to the UE until the empty GRE packet is received. Upon receipt of the empty GRE packet, the target gateway begins sending data packets received directly from a home network gateway to the UE.

28 Claims, 13 Drawing Sheets

(56) References Cited

U.S. PATENT DOCUMENTS

| | | | |
|---|---|---|---|
| 2010/0142488 | A1 | 6/2010 | Zhang et al. |
| 2010/0195558 | A1 | 8/2010 | Koskinen |
| 2010/0215020 | A1* | 8/2010 | Lee et al. .................. 370/331 |
| 2010/0290621 | A1* | 11/2010 | Muhanna et al. ............ 380/270 |
| 2011/0044225 | A1 | 2/2011 | Rinne et al. |
| 2011/0255471 | A1 | 10/2011 | Sundell et al. |
| 2011/0269495 | A1 | 11/2011 | Hapsari et al. |
| 2011/0317658 | A1 | 12/2011 | Tooyama et al. |
| 2012/0177002 | A1 | 7/2012 | Faucher et al. |
| 2012/0238208 | A1* | 9/2012 | Bienas et al. ............... 455/41.2 |
| 2012/0252355 | A1 | 10/2012 | Huang et al. |
| 2012/0294276 | A1 | 11/2012 | Jaiswal et al. |
| 2012/0294277 | A1 | 11/2012 | Jaiswal et al. |

OTHER PUBLICATIONS

3GPP Specification TS 23.401 V10.2.1 "3rd Generation Partnership Project; Technical Specification Group Services and System Aspects; General Packet Radio Service (GPRS) enhancements for Evolved Universal Terrestrial Radio Access Network (E-UTRAN) access" Release 10, Jan. 4, 2011, the whole document.

3GPP Specification TS 23.402 V10.2.0, "3rd Generation Partnership Project; Technical Specification Group Services and System Aspects; Architecture enhancements for non-3GPP accesses" Release 10, Jan. 4, 2011, the whole document.

3GPP2 Specification X.50057-0, "E-UTRAN-eHRPD Connectivity and Interworking: Core Network Aspects", version 1.0, Apr. 2009, the whole document.

Racz A. et al. "Handover Performance in 3GPP Long Term Evolution (LTE)," Mobile and Wireless Communications Summit, 2007. 16$^{th}$ IST, Jul. 1-5, 2007, the whole document.

3GPP TS 29.281, version 9.3.0; Universal Mobile Telecommunication System (UMTS); LTE; General Packet Radio System (GPRS) Tunneling Protocol User Plane (GTPv1-U) (Jun. 2010).

Catt, "End Marker support during Intra-EUTRAN handover procedure," 3GPP Draft; S2-084883, 3$^{rd}$ Generation Partnership Project (3GPP), Mobile Competence Centre; 650, Route Des Lucioles; F-06921 Sophia-Antipolis Cedex; France, vol. SA WG2, no. Montreal; Jun. 18, 2008, XP050266971, the whole document.

Catt, End Marker During Handover Procedure with Serving GW Change, S2-084884, 3GPP TSG SA WG2 Meeting #66, 23.401 CR 0363, revision 1, version 8.2.0 , Montreal, Canada, Jun. 23-27, 2008 pp. 1-10.

3GPP TS 36.300 V10.4.0 (Jun. 2011); 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), dated Jun. 24, 2011, the whole document.

3GPP TS 23.401 V9.9.0 (Jun. 2011) 3$^{rd}$ Generation Partnership Project; Technical Specification Group Services and System Aspects; General Packet Radio Service (GPRS) enhancements for Evolved Universal Terrestrial Radio Access network (U-TRAN) access (Release 9), dated Jun. 12, 2011, the whole document.

3GPP TS 23.402 V9.9.0 (Jun. 2011) 3$^{rd}$ Generation Partnership Project; Technical Specification Group Services and System Aspects; Architecture enhancements for non-3GPP accesses (Release 9), dated Jun. 12, 2011, the whole document.

* cited by examiner

INTER-RAT HANDOVER CONTROL USING EMPTY GRE PACKETS

The invention disclosed herein generally relates to handover of a mobile station, and more particularly to in-order delivery of data packets during inter-RAT handover using empty Generic Routing Encapsulation (GRE) packets.

BACKGROUND

The $3^{rd}$ Generation Partnership Project (3GPP) oversees and governs $3^{rd}$ Generation (3G) networks, including 3G Long Term Evolution (LTE) networks. 3G LTE provides mobile broadband to User Equipment (UEs) within the 3G LTE network at higher data rates than generally available with other networks. For example, the air interface for 3G LTE, Evolved Universal Mobile Telecommunication System (UMTS) Terrestrial Radio Access Network (E-UTRAN), utilizes multi-antenna and multi-user coding techniques to achieve downlink data rates of 100 s of Mbps and uplink data rates of 10 s of Mbps.

In LTE, user mobility is controlled by the network with assistance from the UE. Handover decisions, as well as the choices for the target cell and technology (when applicable), are made by the current serving eNodeB (equivalent to Base Station in 2G/3G network) based on measurements made by the eNodeB, and based on measurements reported by the UE to the eNodeB. Due to the nature of E-UTRAN, the number of packets buffered before scheduled transmissions occur may not be negligible. For that reason, packet forwarding mechanisms may be used (when applicable) between a source node and a target node so as to limit packet loss during handover from the source node to the target node.

Due to various delays, e.g., those caused by the forwarding process, the target node may receive forwarded data packets after receiving post-handover data packets. Such delays may cause the target node to deliver data packets to the UE out of order. Procedures currently exist to guarantee in-order packet delivery to the UE during handover of a UE between network nodes within the same Radio Access Network (RAN) and/or associated with the same Radio Access Technology (RAT). However, because no such procedures exist for handover of a UE between network nodes associated with some RATs, i.e., handover from 3GPP to HRPD (High Rate Packet Data), there is a risk of out-of-order packet delivery.

SUMMARY

Embodiments of the invention disclosed herein use empty GRE (Generic Routing Encapsulation) packets to provide in-order delivery of data packets for a session to a UE (User Equipment) during inter-RAT (Radio Access Technology) handover. In particular, an empty GRE packet sent from a source gateway in a source RAN (Radio Access Network) to a target gateway in a target RAN indicates to the target gateway the end of forwarded data packets from the source gateway. The target gateway sends data packets received from the source gateway to the UE until the empty GRE packet is received. Upon receipt of the empty GRE packet, the target gateway begins sending data packets received directly from a home network gateway to the UE.

The network gateway, source gateway, and target gateway each play a part in implementing the inter-RAT handover described herein. After receiving handover instructions, the network gateway sends an end-marker packet to the source gateway to indicate the end of the data packets being sent by the network gateway to the source gateway. If the session includes more than one bearer stream, the network gateway sends an end-marker packet for each bearer stream. The network gateway subsequently sends one or more data packets for the session directly to the target gateway, where the direct data packets are sequentially ordered relative to the data packets sent to the source gateway. In some embodiments, the network gateway may also send an empty GRE packet to the target gateway before sending the data packets to the target gateway. The empty GRE packet indicates the start of the transmission of data packets for the session from the network gateway directly to the target gateway.

The source gateway forwards the data packets to the target gateway in the target RAN. Responsive to receiving an end-marker packet, the source gateway generates and sends an empty GRE packet to the target gateway. If the session includes multiple bearer streams, the source gateway sends the empty GRE packet after receiving the end-marker packet for each bearer stream. The empty GRE packet indicates to the target gateway the end of the forwarded packets for the session.

The target gateway sends data packets to the UE based on the received data packets and the received empty GRE packet(s). More particularly, the target gateway sends the forwarded data packets received from the source gateway to the UE. Responsive to receiving the empty GRE packet from the source gateway, the target gateway sends the data packets received directly from the network gateway to the UE.

DETAILED DESCRIPTION

The embodiments disclosed herein use empty GRE (Generic Routing Encapsulation) packets to deliver packets for a session in-order to a UE (User Equipment) during inter-RAT (Radio Access Technology) handover. In particular, an empty GRE packet sent from a source gateway in a source RAN (Radio Access Network) to a target gateway in a target RAN indicates the end of the data packets from the source gateway. The target gateway sends data packets received from the source gateway to the UE until the empty GRE packet is received. After receipt of the empty GRE packet, the target gateway sends data packets received directly from the network gateway to the UE. While the embodiments are described herein in terms of 3GPP and HRPD networks, the embodiments of the invention disclosed herein may generally apply to any downlink inter-RAT handover.

Figure 1:
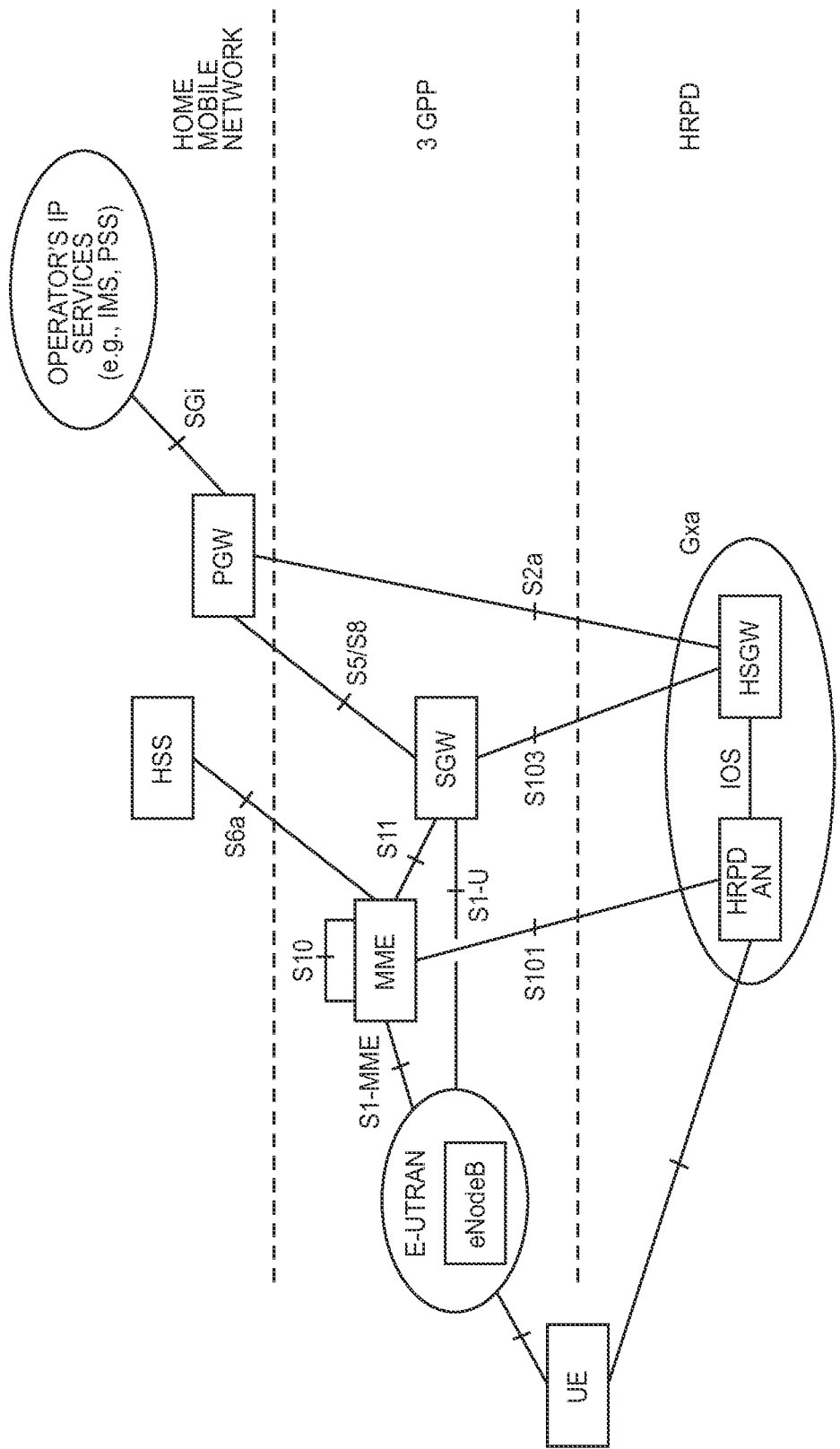
FIG. 1 shows a block diagram of a 3GPP network and HRPD network interfacing with a mobile station.

Before describing further details, the following first generally describes inter-RAT handover. FIG. 1 shows a wireless network including elements associated with a home mobile network, 3GPP RAN, and HRPD RAN during inter-RAT handover of the UE between 3GPP and HRPD. The wireless network applies to both roaming and non-roaming scenarios, where the S5 interface between the Packet Data Network (PDN) Gateway (PGW) and the Serving Gateway (SGW) applies to non-roaming scenarios, and the S8 interface between the PGW and SGW applies to roaming scenarios. It will be appreciated that FIG. 1 omits various elements, e.g., the PCRF, AAA servers, etc., for simplicity.

The home mobile network represents one or more external networks, and includes an IP node, a Home Subscriber Server (HSS), and a PGW. The IP node provides data associated with IP services, e.g., IMS, PSS, etc., to the PGW. The HSS comprises a central database containing user-related and subscription-related information. In addition, the HSS provides mobility management, call and session establishment support, user authentication, and access authorization. The PGW provides connectivity between the UE and the home mobile network. Further, the PGW serves as an anchor for mobility between 3GPP and non-3GPP technologies.

The PGW provides data packets for a session to the SGW via the S5 (non-roaming) or S8 (roaming) interface. The SGW routes GTP data packets to an eNodeB of the E-UTRAN via the S1-U interface for transmission to the UE according to the 3GPP standard. After the eNodeB makes the decision to handover the UE to a non-3GPP network, e.g., the HRPD network, the eNodeB returns any received GTP data packets for the session back to the SGW. The SGW forwards the returned data packets to the HSGW via the S103 interface as GRE data packets.

To complete the handover, the PGW sends a GTP-U end-marker packet to the SGW to indicate the end of the data packets being sent to the SGW. Subsequently, the PGW sends GRE data packets for the session to the HSGW via the S2a interface. After the downlink path is switched at the PGW, forwarded data packets on the S103 interface and GRE data packets on the S2a interface may arrive interchanged at the HSGW, which may hinder or otherwise prevent the HSGW from delivering the data packets for the session via the HRPD AN to the UE in order.

One possible solution to this problem is to insert sequence numbers in the header of each data packet. While such sequence numbers would enable the HSGW to determine the correct order for the data packets, using such sequence numbers also undesirably increases the overhead and signal processing associated with the transmission of each data packet.

Figure 2:
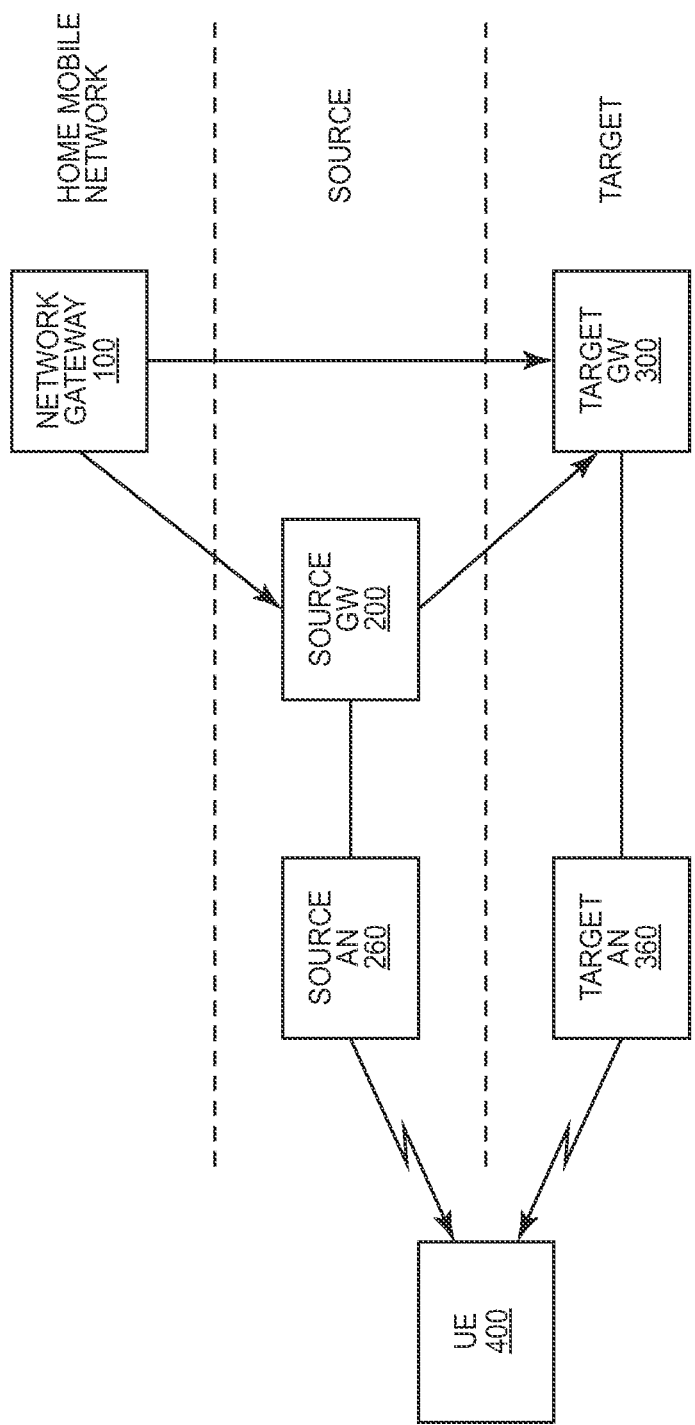
FIG. 2 shows a simplified block diagram of the source and target networks interfacing with the mobile station during inter-RAT handover according to one exemplary embodiment disclosed herein.

The inter-RAT handover described herein solves this problem by using an empty GRE packet to indicate the end of the forwarded packets to the HSGW. FIG. 2 shows a simplified block diagram of the wireless network implementing the inter-RAT handover described herein. The wireless network includes a network gateway 100 in a home mobile network, a source gateway 200 in a source network, and a target gateway 300 in a target network. The source network sends data packets from the SGW 200 to the UE 400 via the source AN 260. The target network sends data packets from the target gateway 300 to the UE 400 via the target AN 360. While not required, examples of the network gateway 100, source gateway 200, source AN 260, target gateway 300, and target AN 360 respectively comprise the PGW, SGW, eNodeB/E-UTRAN, HSGW, and HRPD AN shown in FIG. 1.

SGW 200 sends an empty GRE packet to the HSGW 300 based on an end-marker packet originating at the PGW 100 and returned to the SGW 200 from the source AN 260. The empty GRE packet indicates to the HSGW 300 the end of the data packets from the SGW 200. The HSGW 300 sends data packets received from the SGW 200 to the UE 400 until the empty GRE packet is received. Upon receipt of the empty GRE packet, HSGW 300 begins sending data packets received directly from the PGW 100 to the UE 400.

Figure 3:
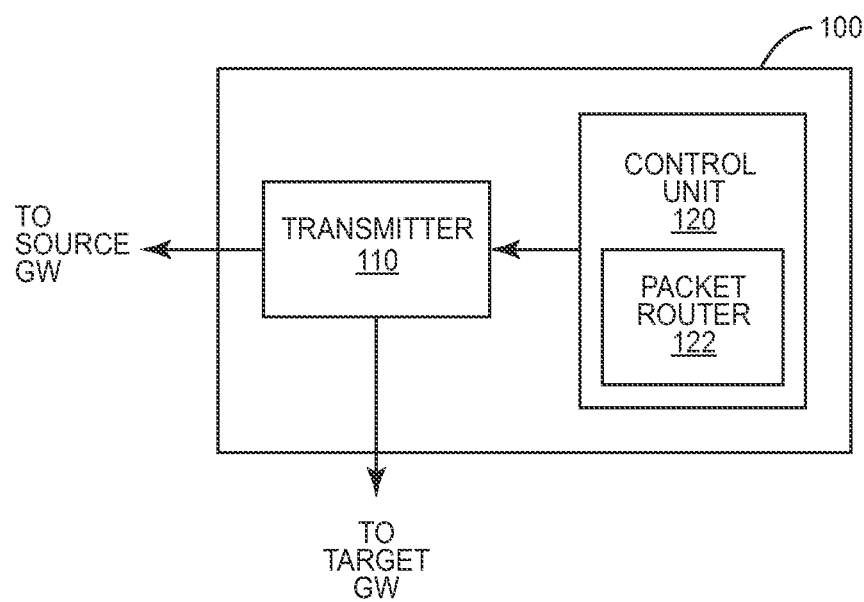
FIG. 3 shows a block diagram of an exemplary network gateway.
Figure 4:
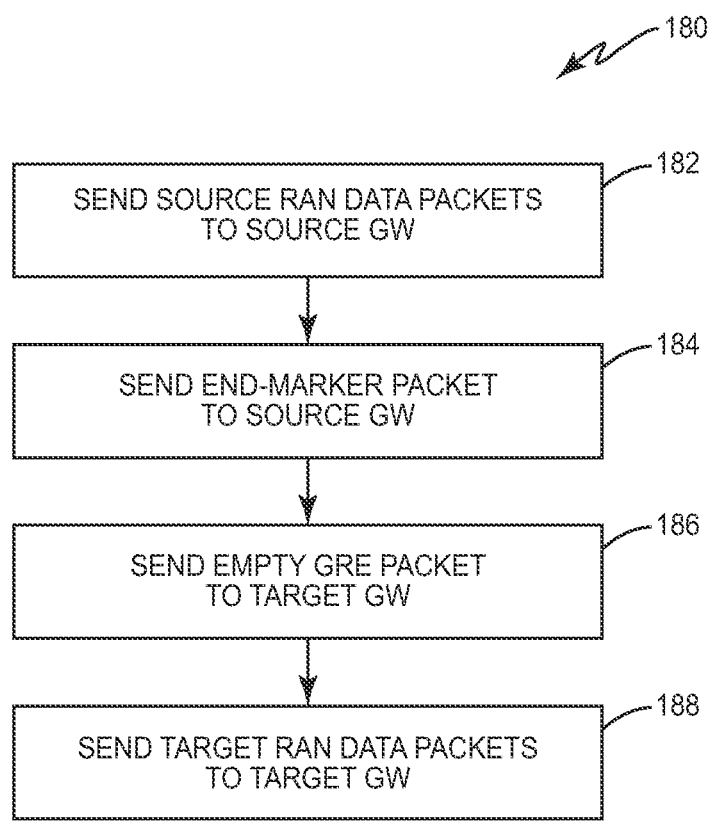
FIG. 4 shows an exemplary method of inter-RAT handover as implemented by the network gateway of FIG. 3.

FIGS. 3 and 4 respectively describe handover operations from the perspective of the PGW 100 and a method 180 implemented by the PGW 100. PGW 100 comprises a transmitter 110 and a control unit 120. Transmitter 110 sends source RAN data packets, e.g., GTP data packets, for the session to the SGW 200 according to 3GPP protocols (block 182). Control unit 120 generally controls the operation of the PGW 100, and includes a packet router 122 to control packet transmissions before, during, and after handover. More particularly, after the transmitter 110 sends the last GTP data packet, packet router 122 controls the transmitter 110 to send an end-marker packet, e.g., a GTP-U end-marker packet, indicating the end of the GTP data packets to the SGW 200 for the session (block 184). If the session includes multiple bearer streams, the packet router 122 controls the transmitter to send an end-marker packet for each bearer stream.

After the end-marker packet(s) are sent to the SGW 200, the packet router 122 controls the transmitter 110 to send target RAN data packets for the session, e.g., GRE data packets, to the UE 400 according to HRPD protocols. In some embodiments, the packet router 122 generates an empty GRE packet and controls the transmitter 110 to send the empty GRE packet to the HSGW 300 (block 186) after sending the end-marker packet(s) to the SGW 200 and before sending the GRE data packets to the HSGW 300. The empty GRE packet indicates the beginning of the subsequent transmission of the GRE data packets for the session to the HSGW 300. After sending the empty GRE packet, the transmitter 110 sends the subsequent GRE data packets for the session to the HSGW 300 (block 188). The subsequent GRE data packets are sequentially ordered relative to the GTP data packets.

Figure 5:
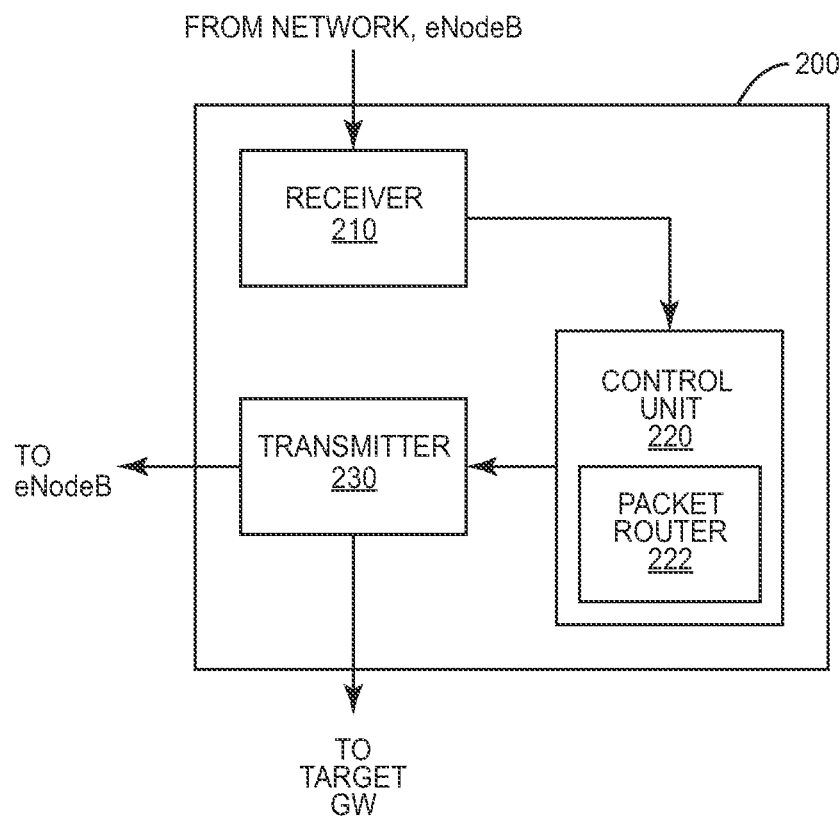
FIG. 5 shows a block diagram of an exemplary source gateway.
Figure 6:
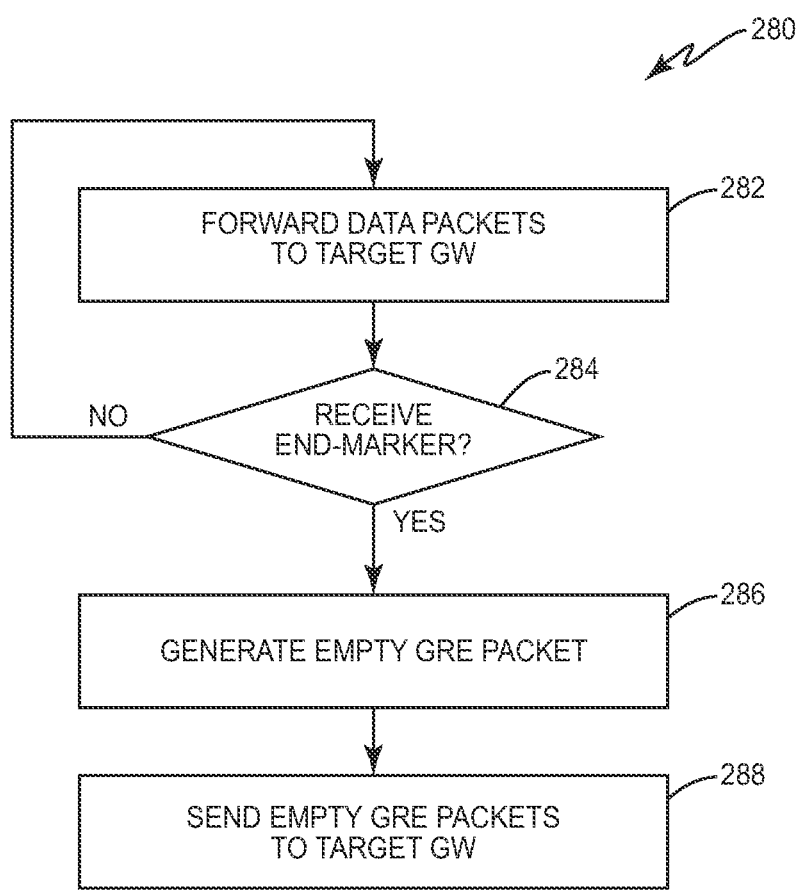
FIG. 6 shows an exemplary method of inter-RAT handover as implemented by the source gateway of FIG. 5.

FIGS. 5 and 6 respectively describe the handover operations from the perspective of the SGW 200 and a method 280 implemented by the SGW 200. The SGW 200 comprises a receiver 210, control unit 220, and transmitter 230. Receiver 210 receives source RAN data packets, e.g., GTP data packets, for the session from the PGW 100. During handover, the receiver 210 also receives an end-marker packet for each of the one or more bearer streams of the session. Control unit 220 comprises a packet router 222 configured to direct the received GTP data packets to the transmitter 230 for transmission to the eNodeB 260. Before handover, the eNodeB 260 transmits the GTP data packets to the UE 400. After eNodeB 260 breaks the connection with the UE 400 during handover, the eNodeB 260 returns any received GTP data packets, including any GTP-U end-marker packet(s) to the SGW 200.

Responsive to receiving returned GTP data packets from the eNodeB 260, the packet router 222 controls the transmitter 230 to forward the data packets as target RAN data packets, e.g., GRE data packets, to the HSGW 300 (block 282). In addition, packet router 222 generates an empty GRE packet responsive to the end-marker packet, e.g., the end-marker packet returned by the eNodeB 260 (blocks 284, 286). If the session includes multiple bearer streams, the packet router 222 generates the empty GRE packet responsive to receiving an end-marker packet for each bearer stream. Subsequently, the packet router 222 controls the transmitter 230 to send the empty GRE packet to the HSGW 300 to indicate to the HSGW 300 the end of the GRE data packets from the SGW 200 (block 288).

Figure 7:
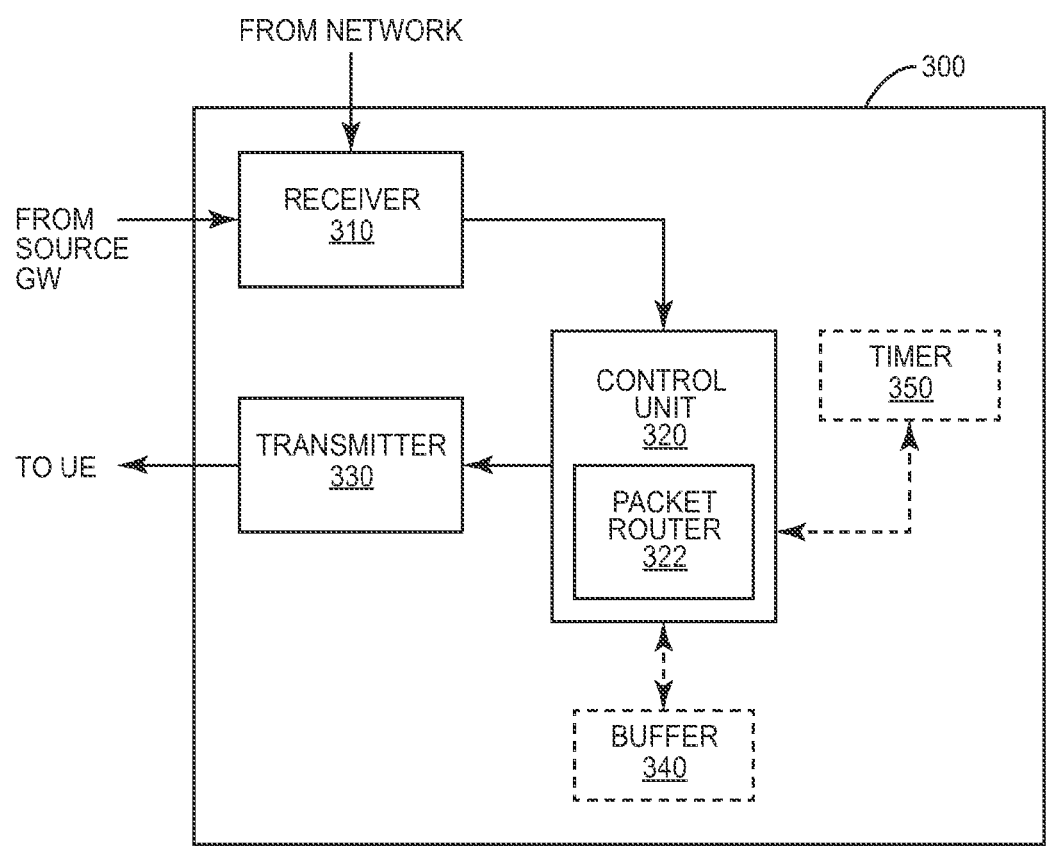
FIG. 7 shows a block diagram of an exemplary target gateway.
Figure 8:
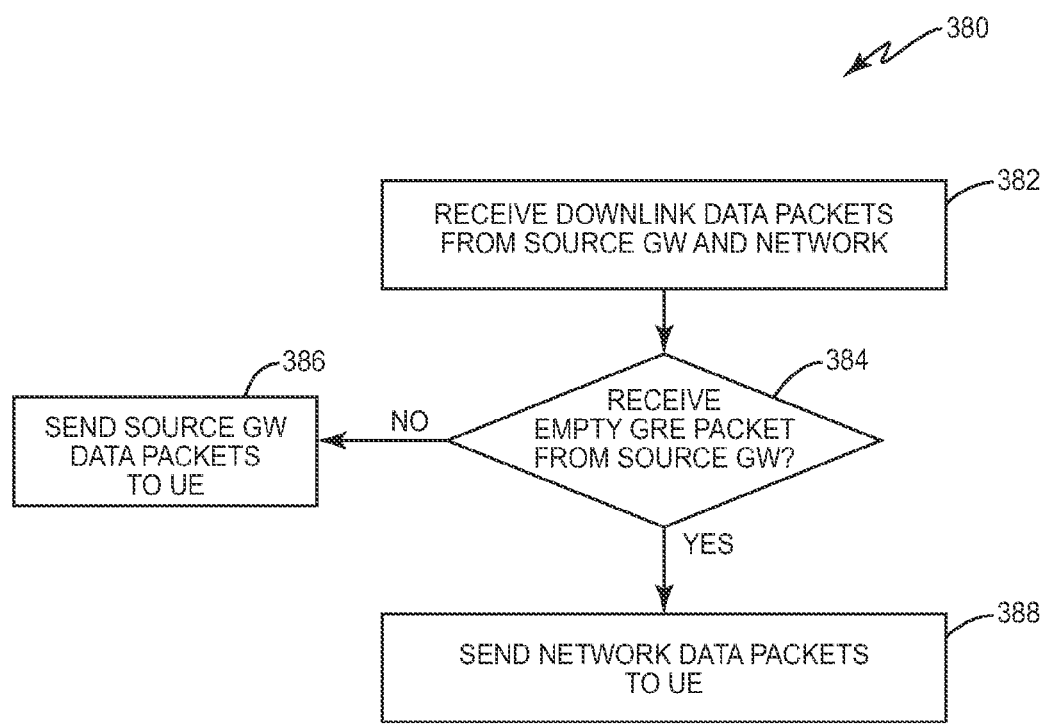
FIG. 8 shows an exemplary method of inter-RAT handover as implemented by the target gateway of FIG. 7.

FIGS. 7 and 8 respectively describe the handover operations from the perspective of the HSGW 300 and a method implemented by the HSGW 300. HSGW 300 includes a receiver 310, control unit 320, and transmitter 330. During handover, receiver 310 receives target RAN data packets for the session, e.g., GRE data packets, from both the SGW 200 and the PGW 100, where the GRE data packets received from the SGW 200 contain payload that is the same as the payload of the GTP data packets originating at the PGW 100 and forwarded by the SGW 200 (block 382). Until the HSGW 300 receives the empty GRE packet from the SGW 200 (block 384), packet router 322 controls the transmitter 320 to send the forwarded data packets from the SGW 200 to the UE 400 via the Access Node (AN) 360 (blocks 384, 386). Once the HSGW 300 receives the empty GRE packet from the SGW 200, the packet router 322 controls the transmitter to send the data packets received directly from the PGW 100 to the UE 400 via AN 360 (blocks 384, 388).

In some embodiments, the HSGW 300 may also include a buffer 340. Buffer 340 buffers the data packets received directly from the PGW 100 until receiver 310 receives the empty GRE packet from the SGW 200. Upon receipt of the empty GRE packet, the packet router 322 controls the transmitter 330 to send the buffered data packets to the UE 400. Once the buffer is empty 340, the packet router 322 controls the transmitter 330 to send the data packets received from the PGW 100.

The HSGW 300 may also include a timer 350 to ensure that the buffered data packets are eventually delivered to the UE 400, even if the empty GRE packet is never received. For example, the packet router 322 may control the transmitter 330 to send the buffered data packets upon expiration of the timer 350. Thus, if the empty GRE packet is lost or damaged, the HSGW 300 will still send the buffered data packets upon expiration of the timer. The timer 350 may be set based on an expected duration of the handover process. In one embodiment, timer 350 starts responsive to receipt of an empty GRE packet from the PGW 100. In anther embodiment, the timer 350 starts responsive to receipt of the first data packet from the PGW 100.

Figure 9:
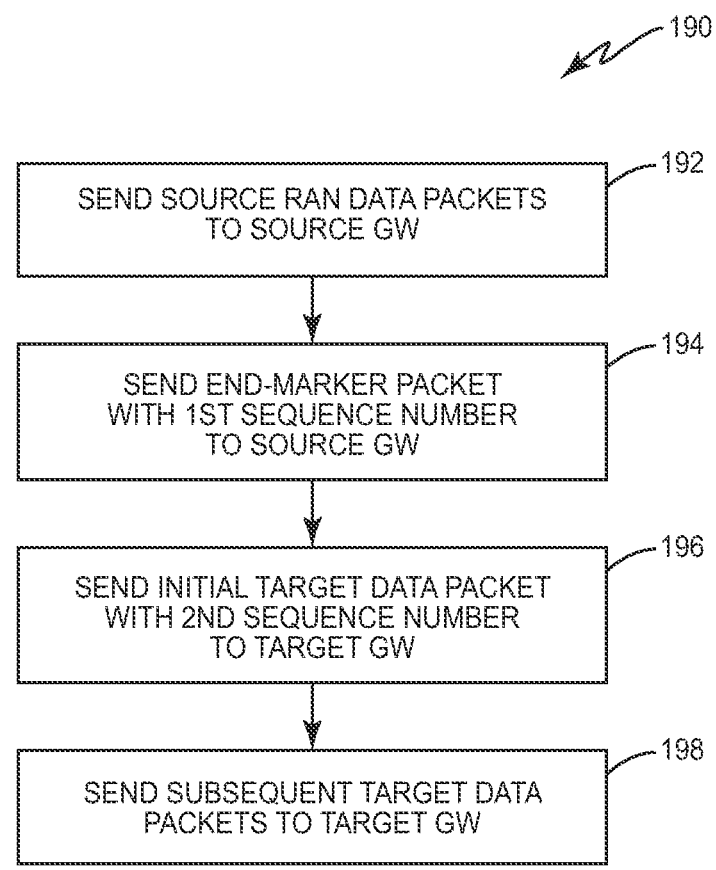
FIG. 9 shows another exemplary method of inter-RAT handover as implemented by the network gateway of FIG. 3.
Figure 10:
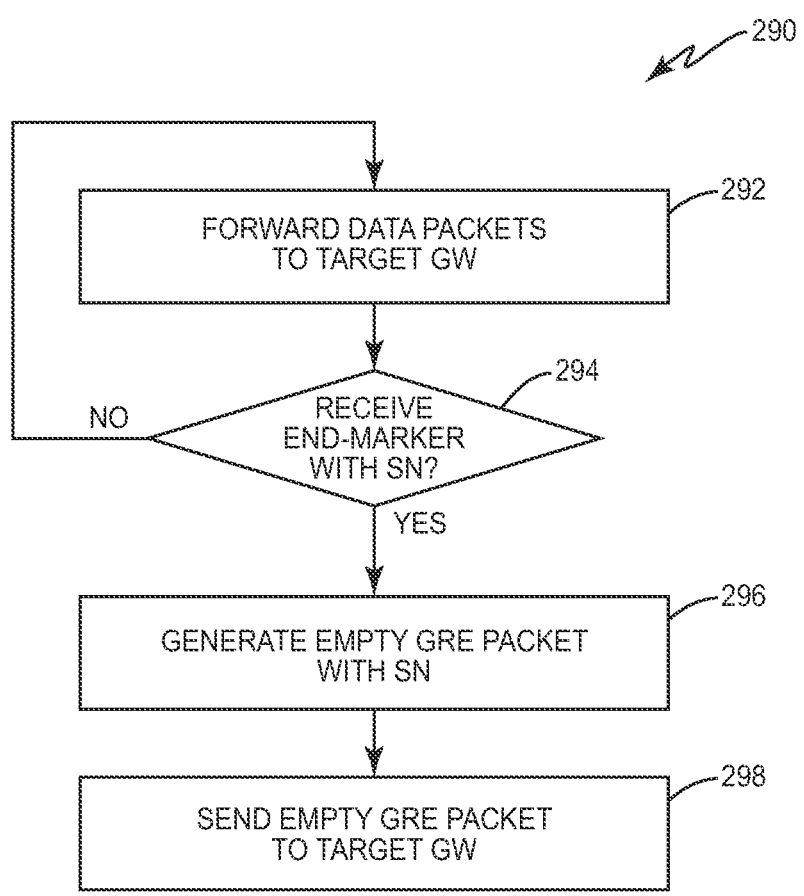
FIG. 10 shows another exemplary method of inter-RAT handover as implemented by the source gateway of FIG. 5.
Figure 11:
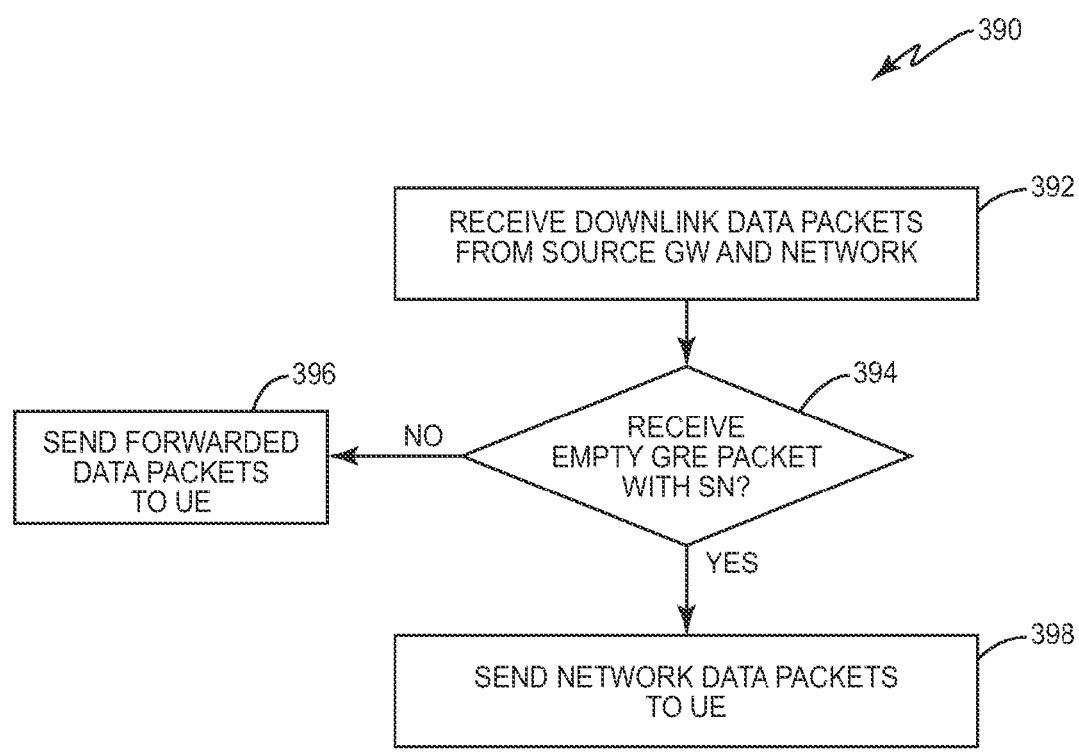
FIG. 11 shows another exemplary method of inter-RAT handover as implemented by the target gateway of FIG. 7.

The embodiments described above rely on empty GRE packets to indicate the end of the session data packets being sent from the SGW 200 to the HSGW 300. In some instances, an empty GRE packet may also be used to indicate the beginning of session data packets being sent from the PGW 100 to the HSGW 300 during handover. Other embodiments may also or alternatively use one or more sequence numbers in a header of an empty packet or a data packet to indicate the end and/or beginning of the data packets. FIGS. 9-11 provide exemplary methods for a PGW 100, SGW 200, and HSGW 300, respectively, when sequence numbers are used to indicate the beginning and/or end of data packet transmissions.

FIG. 9 shows an exemplary method 190 from the perspective of the PGW 100 for handling inter-RAT handover using sequence numbers. Transmitter 110 sends GTP data packets for the session to the SGW 200 (block 192). After the transmitter 110 sends the last GTP data packet, the packet router 122 controls the transmitter 110 to send an end-marker packet indicating the end of the GTP data packets for the session (block 194). The header of the end-marker packet includes a sequence number field containing a first sequence number. If the session includes multiple bearer streams, the packet router 122 controls the transmitter to send an end-marker packet for each bearer stream, where each end-marker packet includes a first sequence number in the header. In one embodiment, the end-marker packet for each bearer stream includes a different sequence number. It will be appreciated, however, that some or all of the end-marker packets may include the same sequence number.

After sending the end-marker packet, the packet router 122 controls the transmitter 110 to send an initial GRE data packet with a second sequence number in the header to the HSGW 300 (block 196). The second sequence number indicates the beginning of the GRE data packets being sent from the PGW 100 directly to the HSGW 300. The initial data packet may contain payload data in the body of the packet. Alternatively, the initial data packet may comprise an empty GRE packet. After sending the initial data packet, transmitter 110 sends the subsequent GRE data packets for the session to the HSGW (block 198). The subsequent GRE data packets are sequentially ordered relative to the GTP data packets sent to the SGW 200.

FIG. 10 shows an exemplary method 290 from the perspective of the SGW 200 for handling inter-RAT handover using sequence numbers. Responsive to receiving returned GTP data packets from the eNodeB, the packet router 222 controls the transmitter 230 to forward the data to the HSGW 300 in GRE data packets (block 292). In addition, packet router 222 generates an empty GRE packet responsive to an end-marker packet, e.g., the end-marker packet returned from the eNodeB 260 (blocks 294, 296). The header of the empty GRE packet includes the sequence number in the returned end-marker packet. If the session includes multiple bearer streams, an end-marker packet containing a sequence number is received for each bearer stream. The packet router 222 selects one of the sequence numbers in the received end-marker packets, e.g., the largest sequence number, and generates the empty GRE packet with the selected sequence number. After the end-marker packet for each bearer stream is received, the packet router 222 controls the transmitter 230 to send the empty GRE packet to the HSGW 300 to indicate to the HSGW 300 the end of the data packets for the session sent by the SGW 200 (block 298).

FIG. 11 shows an exemplary method 390 from the perspective of the HSGW 300 for handling inter-RAT handover using sequence numbers. During handover, receiver 310 receives GRE data packets for the session from both the SGW 200 and the PGW 100, where the GRE data packets received from the SGW 200 contain payload that is the same as the payload of the GTP data packets originating at the PGW 100 and forwarded by the SGW 200 (block 392). Until the HSGW 300 receives the empty GRE packet with the sequence number from the SGW 200 (block 384), the packet router 322 controls the transmitter 320 to send the forwarded GRE data packets from the SGW 200 to the UE 400 via the HRPD AN 360 (blocks 394, 396). Once the HSGW 300 receives the empty GRE packet with the sequence number from the SGW 200, the packet router 322 controls the transmitter to send the GRE data packets received directly from the PGW 100 to the UE 400 via the HRPD AN 360 (blocks 394, 398).

In some embodiments, the HSGW 300 receives an empty GRE packet having a first sequence number from the SGW 200 and an initial data packet having a second sequence number from the PGW 100. In this case, the HSGW 300 determines whether or not the empty GRE packet and initial GRE data packet are being used to indicate the end and beginning of the data packets from the respective gateways by comparing the first and second sequence numbers. If the sequence numbers have the expected relationship, e.g., the second sequence number is greater than the first sequence number, the first and second sequence numbers are equal, etc., control unit 320 determines that the HSGW 300 has received the indication of the end and start of the data packets from the respective SGW 200 and PGW 100. Based on this information, packet router 322 determines whether or not to have the transmitter 330 begin sending the direct data packets from the PGW 100 to the UE 400.

When a buffer 340 and timer 350 are included in the HSGW 300, the packet router 322 may also control the transmitter 330 to send the buffered data packets upon expiration of the timer 350. Thus, if the empty GRE packet is lost or damaged, the HSGW 300 will still send the buffered data packets upon expiration of the timer. The timer 350 may be set based on an expected duration of the handover process. In one embodiment, timer 350 starts responsive to receipt of the empty GRE packet with the sequence number from the PGW 100. In anther embodiment, the timer 350 starts responsive to receipt of the first data packet containing a sequence number from the PGW 100.

When the empty GRE packet sent from the SGW 200 includes a sequence number, the previously sent data packets generally do not include a sequence number. Similarly, when the initial data packet sent form the PGW 100 includes a sequence number, the subsequently sent data packets generally do not include sequence numbers. It will be appreciated, however, that the embodiments disclosed herein do not preclude the use of sequence numbers in the other data packets.

Figure 12:
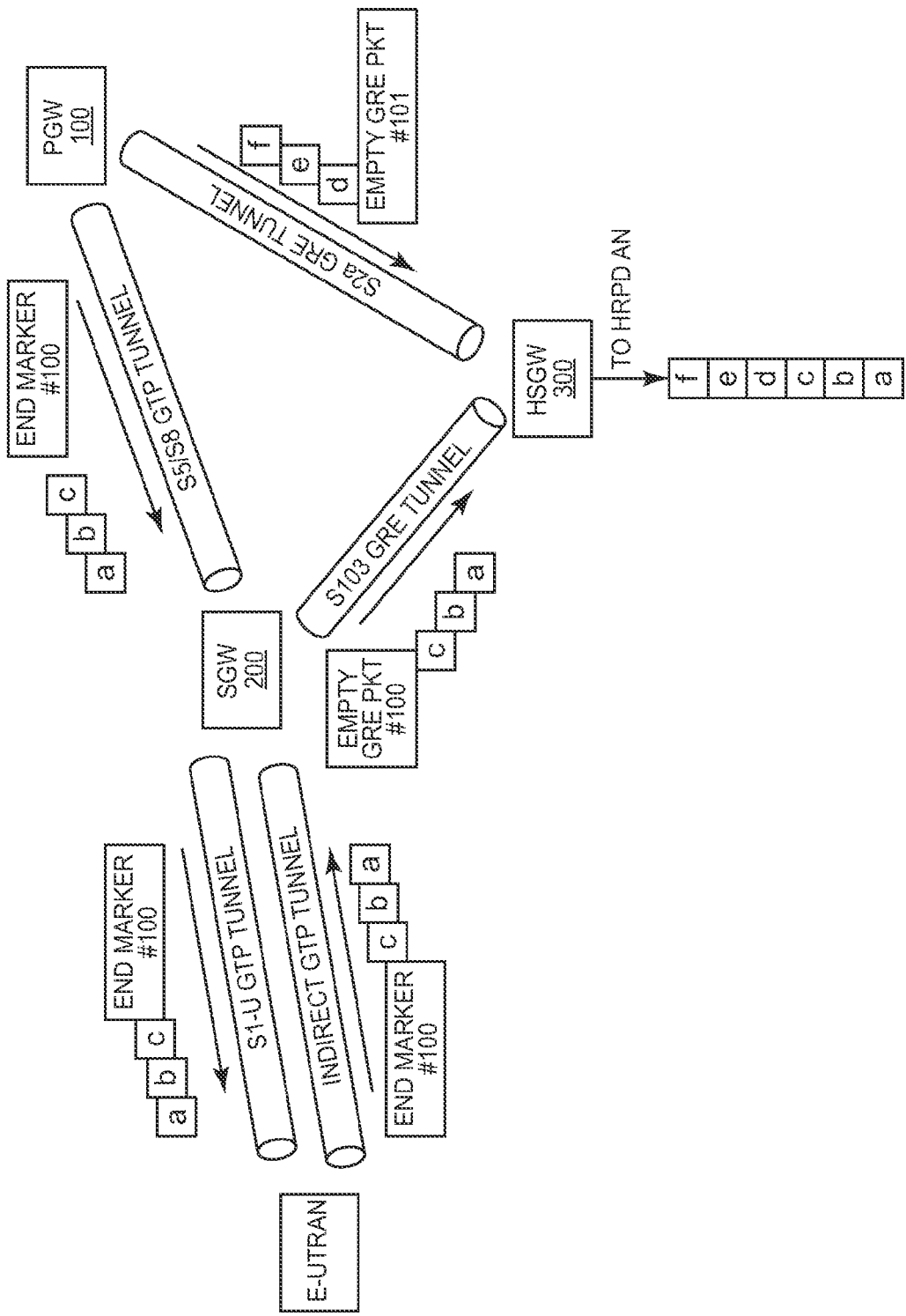
FIG. 12 shows an example of inter-RAT handover between 3GPP and HRPD networks according to one exemplary embodiment disclosed herein.
Figure 13:
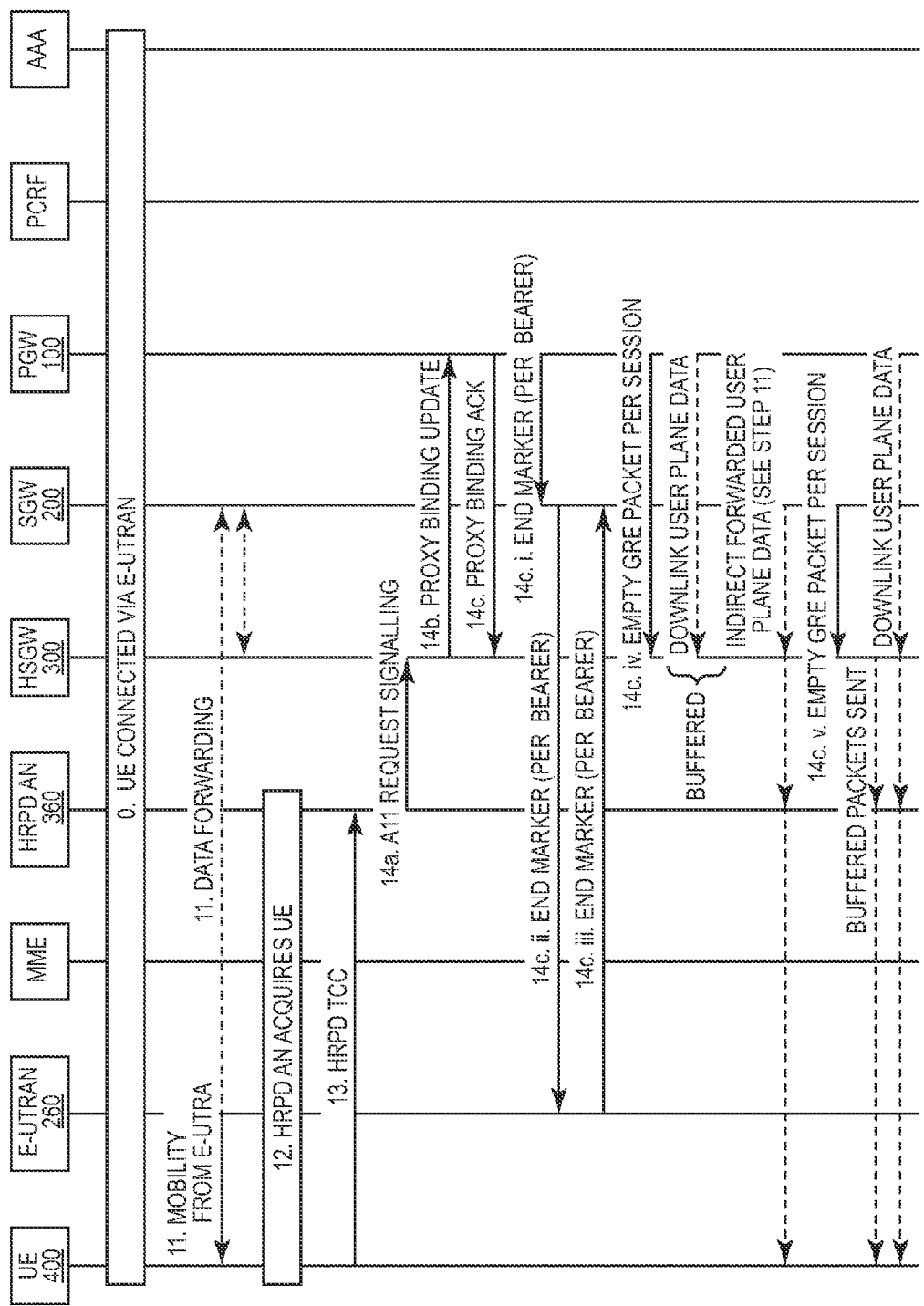
FIG. 13 shows an example of a call flow diagram for the inter-RAT handover of FIG. 2.

FIGS. 12 and 13 respectively show an exemplary block diagram and call flow diagram implementing handover from a 3GPP network to an HRPD network according to one exemplary embodiment. PGW 100 sends user payload packets a, b, and c to the SGW 200 via the S5/S8 GTP tunnel. SGW 200 sends the user payload packets a, b, and c to the eNodeB 260 in the E-UTRAN via the S1-U GTP tunnel. Because eNodeB 260 has already disconnected from the UE 400 and the HRPD AN 360 has connected to the UE 400, the eNodeB 260 returns the user payload packets a, b, and c to the SGW 200 via an indirect GTP tunnel.

After sending the last data packet (data packet c), the PGW 100 sends an end-marker packet for each bearer stream (call flow item 14c.i). In the example in FIG. 12, there is only one bearer stream, and the associated end-marker packet includes sequence number 100. SGW 200 sends the end-marker packet to the eNodeB 260 (call flow item 14c.ii), which returns it to the SGW 200 as part of the data packet forwarding process (call flow item 14c.iii). Responsive to the returned end-marker packet, the SGW 200 generates an empty GRE packet that includes sequence number 100. After SGW 200 forwards the user payload packets a, b, and c to the HSGW 300 via the S103 GRE tunnel, the SGW 200 sends the empty GRE packet to the HSGW (call flow item 14c.v).

After PGW 100 sends the end-marker packet(s) to SGW 200 (call flow item 14c.i), the PGW 100 sends an initial packet followed by user payload packets d, e, and f to the HSGW 300 via the S2a GRE tunnel. In the example shown in FIG. 12, the initial packet comprises an empty GRE packet that includes sequence number 101 (call flow item 14c.iv). The HSGW 300 receives user payload packets a, b, and c and sends them to the HRPD AN 360 for transmission to the UE 400. Upon receipt of the empty GRE packet, the control unit 320 compares the sequence number in the empty GRE packet received from the SGW 200 to the sequence number in the empty GRE packet received from the PGW 100. Because sequence number 101 is greater than sequence number 100, as expected by the HSGW 300, the HSGW sends user payload packets d, e, and f to the HRPD AN 360. If the HSGW 300 receives user payload packets d, e, or f before receiving the empty GRE packet with sequence number 100, the HSGW 300 buffers user payload packets d, e, and/or f in buffer 340 until the empty GRE packet is received, and sends the buffered user payload packets to the HRPD AN 360 after the empty GRE packet is received. After the buffer is emptied, the HSGW 300 sends user payload packets received from the PGW 100 via the S2a GRE tunnel in the order they are received.

While the embodiments are generally described herein in terms of handover of a UE 400 from 3GPP to HRPD, it will be appreciated that the various embodiments and details also apply to handover of a UE 400 from HRPD to 3GPP, where the source, target, and network gateways respectively comprise the HSGW 300, SGW 200, and PGW 100. In particular, an empty GRE packet sent from the HSGW 300 to the SGW 200 indicates the end of the data packets from the HSGW 300. The SGW 200 sends data packets received from the HSGW 300 to the UE 400 until the empty GRE packet is received. After receipt of the empty GRE packet, the SGW 200 sends data packets received directly from the PGW 100 to the UE 400.

The embodiments disclosed herein facilitate inter-RAT handover by ensuring in-order delivery of data packets to the UE during the handover. The inter-RAT handover disclosed herein may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a target gateway in a target Radio Access Network (RAN) of delivering data packets for a session to a mobile station during inter-RAT (Radio Access Technology) handover, the method comprising:
   receiving one or more forwarded packets for the session from a source gateway in a source RAN;
   receiving a first empty GRE (Generic Routing Encapsulation) packet from the source gateway indicating the end of the forwarded packets for the session;
   sending the forwarded packets to the mobile station;
   receiving one or more direct packets for the session from a network gateway, said direct packets sequentially ordered relative to the forwarded packets; and
   sending the direct packets to the mobile station responsive to receiving the first empty GRE packet.

2. The method of claim 1 further comprising starting a timer responsive to receiving a first one of the direct packets, wherein sending the direct packets comprises sending the direct packets to the mobile station responsive to expiration of the timer.

3. The method of claim 1 further comprising receiving a second empty GRE packet from the network gateway indicating the start of the direct packets for the session.

4. The method of claim 3 further comprising starting a timer responsive to receiving the second empty GRE packet, wherein sending the direct packets comprises sending the direct packets to the mobile station responsive to expiration of the timer.

5. The method of claim 1 wherein receiving the first empty GRE packet comprises receiving the first empty GRE packet before receiving the direct packets for the session, and wherein sending the direct packets to the mobile station responsive to receiving the first empty GRE packet comprises sending the direct packets to the mobile station upon receipt of the direct packets at the target gateway.

6. The method of claim 1 further comprising buffering, in the target gateway, the direct packets received from the network gateway before receipt of the first empty GRE packet, wherein sending the direct packets comprises sending the buffered packets after receiving the first empty GRE packet.

7. The method of claim 1 wherein the source gateway comprises one of a $3^{rd}$ Generation Partnership Project (3GPP) serving gateway and a High Rate Packet Data (HRPD) serving gateway, the target gateway comprises the other of the 3GPP serving gateway and the HRPD serving gateway, and the network gateway comprises a Packet Data Network (PDN) Gateway (PGW).

8. A target gateway in a target Radio Access Network (RAN) to deliver data packets for a session to a mobile station during inter-RAT (Radio Access Technology) handover, said target gateway comprising:
a receiver configured to:
receive one or more forwarded packets for the session from a source gateway in a source RAN;
receive a first empty GRE (Generic Routing Encapsulation) packet from the source gateway indicating the end of the forwarded packets for the session; and
receive one or more direct packets for the session from a network gateway, said direct packets sequentially ordered relative to the forwarded packets;
a transmitter configured to send the forwarded packets to the mobile station; and
a control unit coupled to the transmitter and comprising a packet router configured to control the transmitter to send the direct packets to the mobile station responsive to receipt of the first empty GRE packet.

9. The target gateway of claim 8 further comprising a timer, wherein said control unit is further configured to start the timer responsive to receipt of a first one of the direct packets at the receiver, and wherein the packet router controls the transmitter by controlling the transmitter to send the direct packets to the mobile station responsive to expiration of the timer.

10. The target gateway of claim 8 wherein the receiver is further configured to receive a second empty GRE packet from the network gateway indicating the start of the direct packets.

11. The target gateway of claim 10 further comprising a timer, wherein said control unit is further configured to start the timer responsive to receipt of the second empty GRE packet, and wherein the packet router controls the transmitter by controlling the transmitter to send the direct packets to the mobile station responsive to expiration of the timer.

12. The target gateway of claim 8 wherein when the receiver receives the first empty GRE packet before receiving the direct packets for the session, the packet router controls the transmitter to send the direct packets to the mobile station upon receipt of the direct packets by the receiver.

13. The target gateway of claim 8 further comprising a buffer for buffering the direct packets received before receipt of the first empty GRE packet, wherein the packet router controls the transmitter by controlling the transmitter to send the buffered packets after receipt of the first empty GRE packet.

14. The target gateway of claim 8 wherein the source gateway comprises one of a $3^{rd}$ Generation Partnership Project (3GPP) serving gateway and a High Rate Packet Data (HRPD) serving gateway, the target gateway comprises the other of the 3GPP serving gateway and the HRPD serving gateway, and the network gateway comprises a Packet Data Network (PDN) Gateway (PGW).

15. A method implemented by a network gateway of downlink data packets for a session to a mobile station during inter-RAT (Radio Access Technology) handover, the method comprising:
sending one or more first data packets for a bearer stream of the session to a source gateway in a source RAN (Radio Access Network) using a first RAT;
sending an end-marker packet indicating the end of the first data packets for the bearer stream of the session to the source gateway using the first RAT;
sending one or more second data packets for the session to a target gateway in a target RAN using a second RAT; and
sending an empty GRE (Generic Routing Encapsulation) packet to the target gateway using the second RAT after sending the end-marker packet and before sending the second data packets to indicate the start of the second data packets.

16. The method of claim 15 wherein the session includes a plurality of bearer streams associated with the first RAT, each bearer stream having a plurality of data packets, and wherein:
sending the end-marker packet comprises sending an end-marker packet for each of a plurality of bearer streams to the source gateway using the first RAT, each end-marker packet indicating the end of the first data packets for the associated bearer stream of the session; and
sending the empty GRE packet to the target gateway comprises sending the empty GRE packet to the target gateway using the second RAT after sending the end-marker packet for each bearer stream and before sending the second data packets to indicate the start of the second data packets.

17. The method of claim 15 wherein the source gateway comprises one of a $3^{rd}$ Generation Partnership Project (3GPP) serving gateway and a High Rate Packet Data (HRPD) serving gateway, the target gateway comprises the other of the 3GPP serving gateway and the HRPD serving gateway, and the network gateway comprises a Packet Data Network (PDN) Gateway (PGW).

18. A network gateway to deliver data packets for a session to a mobile station during inter-RAT (Radio Access Technology) handover, the network gateway comprising:
a transmitter configured to:
send one or more first data packets for a bearer stream of the session to a source gateway in a source RAN (Radio Access Network) using a first RAT;
send an end-marker packet indicating the end of the first data packets for the bearer stream of the session to the source gateway using the first RAT;
send one or more second data packets for the session to a target gateway in a target RAN using a second RAT; and
send an empty GRE (Generic Routing Encapsulation) packet to the target gateway using the second RAT; and
a control unit coupled to the transmitter and comprising a packet router configured to control the transmitter to send the empty GRE packet after sending the end-marker packet and before sending the second data packets.

19. The network gateway of claim 18 wherein the session includes a plurality of bearer streams associated with the first RAT, each bearer stream having a plurality of data packets,
wherein the transmitter sends the end-marker packet by sending an end-marker packet for each bearer stream to the source gateway using the first RAT, each end-marker packet indicating the end of the first data packets for the associated bearer stream of the session; and
wherein the packet router controls the transmitter by controlling the transmitter to send the empty GRE packet after sending the end-marker packet for each bearer stream and before sending the second data packets to indicate the start of the second data packets.

20. The network gateway of claim 18 wherein the source gateway comprises one of a $3^{rd}$ Generation Partnership Project (3GPP) serving gateway and a High Rate Packet Data (HRPD) serving gateway, the target gateway comprises the other of the 3GPP serving gateway and the HRPD serving gateway, and the network gateway comprises a Packet Data Network (PDN) Gateway (PGW).

21. A method implemented by a source gateway in a source Radio Access Network (RAN) of delivering data packets for a session to a mobile station during inter-RAT (Radio Access Technology) handover, the method comprising:
receiving one or more data packets for a bearer stream of the session from a network gateway;
receiving an end-marker packet indicating the end of the data packets for the bearer stream of the session;
forwarding data packets to a target gateway in a target RAN;
generating an empty GRE (Generic Routing Encapsulation) packet responsive to the received end-marker packet; and
sending the empty GRE packet to the target gateway after receiving the end-marker packet.

22. The method of claim 21 wherein receiving the end-marker packet comprises receiving the end-marker packet for each of a plurality of bearer streams of the session, wherein sending the empty GRE packet comprises sending the empty GRE packet after receiving the end-maker packet for each bearer stream.

23. The method of claim 21 wherein receiving the end-marker packet comprises receiving the end-marker packet sent to a source access node in the source RAN and returned to the source gateway by the source access node, and wherein generating the empty GRE packet comprises generating the empty GRE packet responsive to the end-marker packet returned from the source access node.

24. The method of claim 21 wherein the source gateway comprises one of a $3^{rd}$ Generation Partnership Project (3GPP) serving gateway and a High Rate Packet Data (HRPD) serving gateway, the target gateway comprises the other of the 3GPP serving gateway and the HRPD serving gateway, and the network gateway comprises a Packet Data Network (PDN) Gateway (PGW).

25. A source gateway in a source Radio Access Network (RAN) to deliver data packets for a session to a mobile station during inter-RAT (Radio Access Technology handover, the source gateway comprising:
a receiver configured to receive one or more data packets for a bearer stream of the session from a network gateway;
a control unit comprising a packet router configured to generate an empty GRE (Generic Routing Encapsulation) packet responsive to an end-marker packet, said end-marker packet indicating the end of the data packets for the bearer stream of the session; and
a transmitter configured to:
forward the data packets to a target gateway in the target RAN; and
send the empty GRE packet to the target gateway after the receiver receives the end-marker packet.

26. The source gateway of claim 25 wherein the receiver receives the end-marker packet for each of a plurality of bearer streams of the session, and wherein the transmitter sends the empty GRE packet after the receiver receives the end-marker packet for each bearer stream.

27. The source gateway of claim 25 wherein the receiver receives the end-marker packet by receiving the end-marker packet sent to a source access node in the source RAN and returned to the source gateway by the source access node, and wherein the packet router generates the empty GRE packet responsive to the end-marker packet returned from the source access node.

28. The source gateway of claim 25 wherein the source gateway comprises one of a $3^{rd}$ Generation Partnership Project (3GPP) serving gateway and a High Rate Packet Data (HRPD) serving gateway, the target gateway comprises the other of the 3GPP serving gateway and the HRPD serving gateway, and the network gateway comprises a Packet Data Network (PDN) Gateway (PGW).

* * * * *

UNITED STATES PATENT AND TRADEMARK OFFICE
CERTIFICATE OF CORRECTION

PATENT NO.       : 8,902,852 B2
APPLICATION NO.  : 13/111141
DATED            : December 2, 2014
INVENTOR(S)      : Jaiswal et al.

It is certified that error appears in the above-identified patent and that said Letters Patent is hereby corrected as shown below:

Title Page

On Page 2, in Item (56), under "OTHER PUBLICATIONS", in Column 1, Line 10, delete "3GPP2 Specification X.50057-0," and insert -- 3GPP Specification X.S0057-0, --, therefor.

In the Specification

In Column 5, Line 22, delete "transmitter 320" and insert -- transmitter 330 --, therefor.

In Column 5, Line 48, delete "anther" and insert -- another --, therefor.

In Column 6, Line 57, delete "transmitter 320" and insert -- transmitter 330 --, therefor.

In Column 7, Line 23, delete "anther" and insert -- another --, therefor.

In the Claims

In Column 12, Line 12, in Claim 25, delete "Technology" and insert -- Technology) --, therefor.

Signed and Sealed this
Twenty-eighth Day of July, 2015

Michelle K. Lee
*Director of the United States Patent and Trademark Office*